Figure 1:
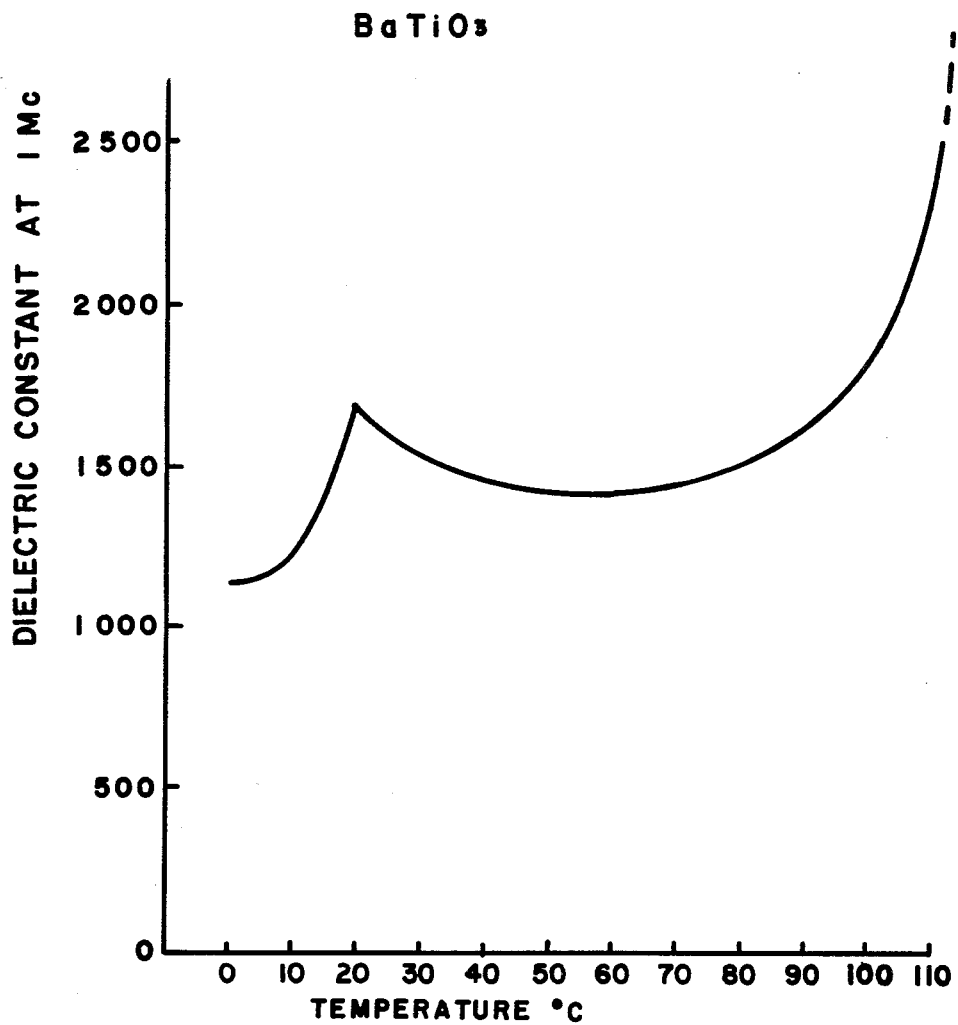

May 22, 1962  A. D. JANULIONIS  3,035,927
CERAMIC DIELECTRIC COMPOSITIONS
Filed Dec. 31, 1959  3 Sheets-Sheet 1

INVENTOR
ANTHONY D. JANULIONIS
BY
ATTORNEY

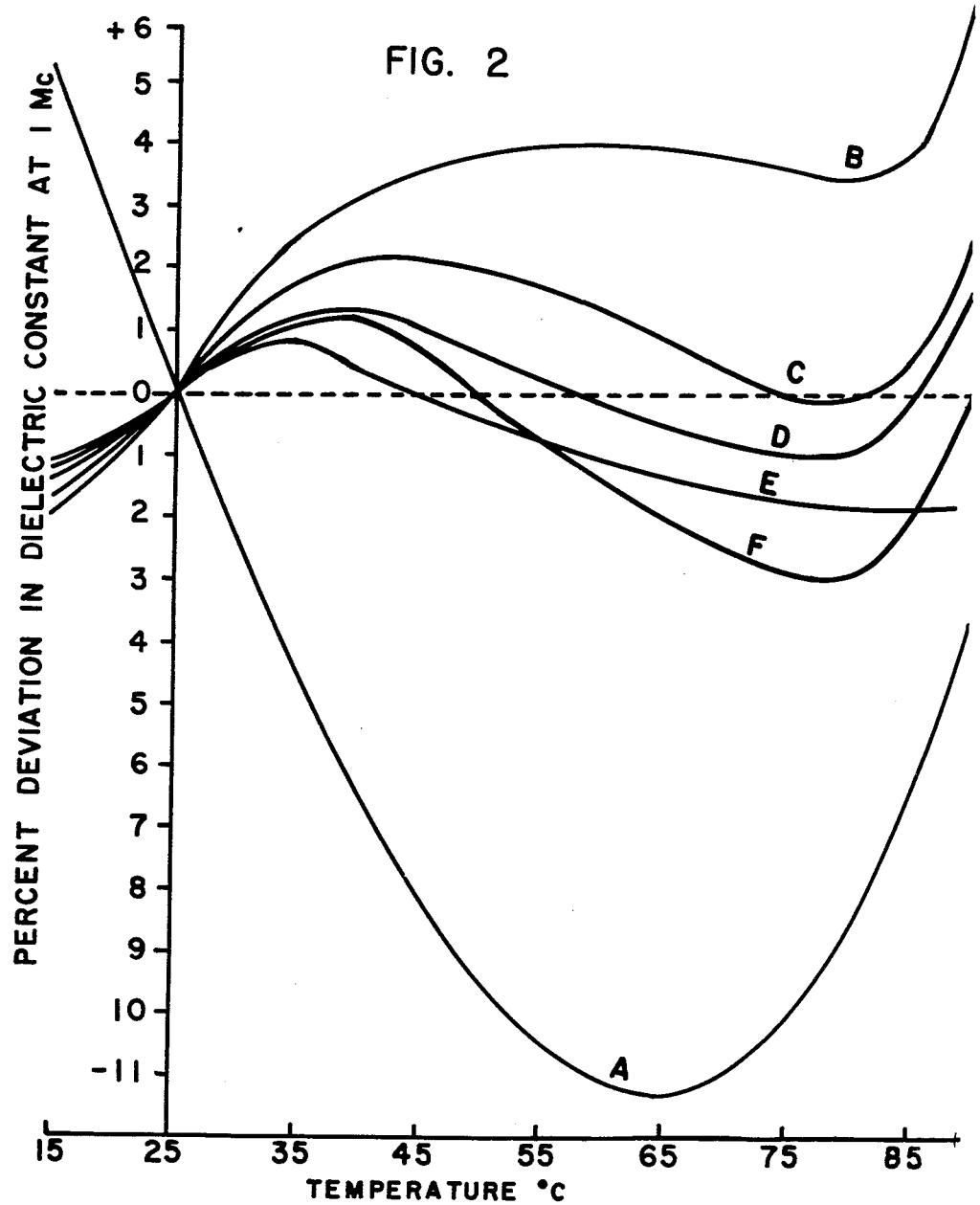

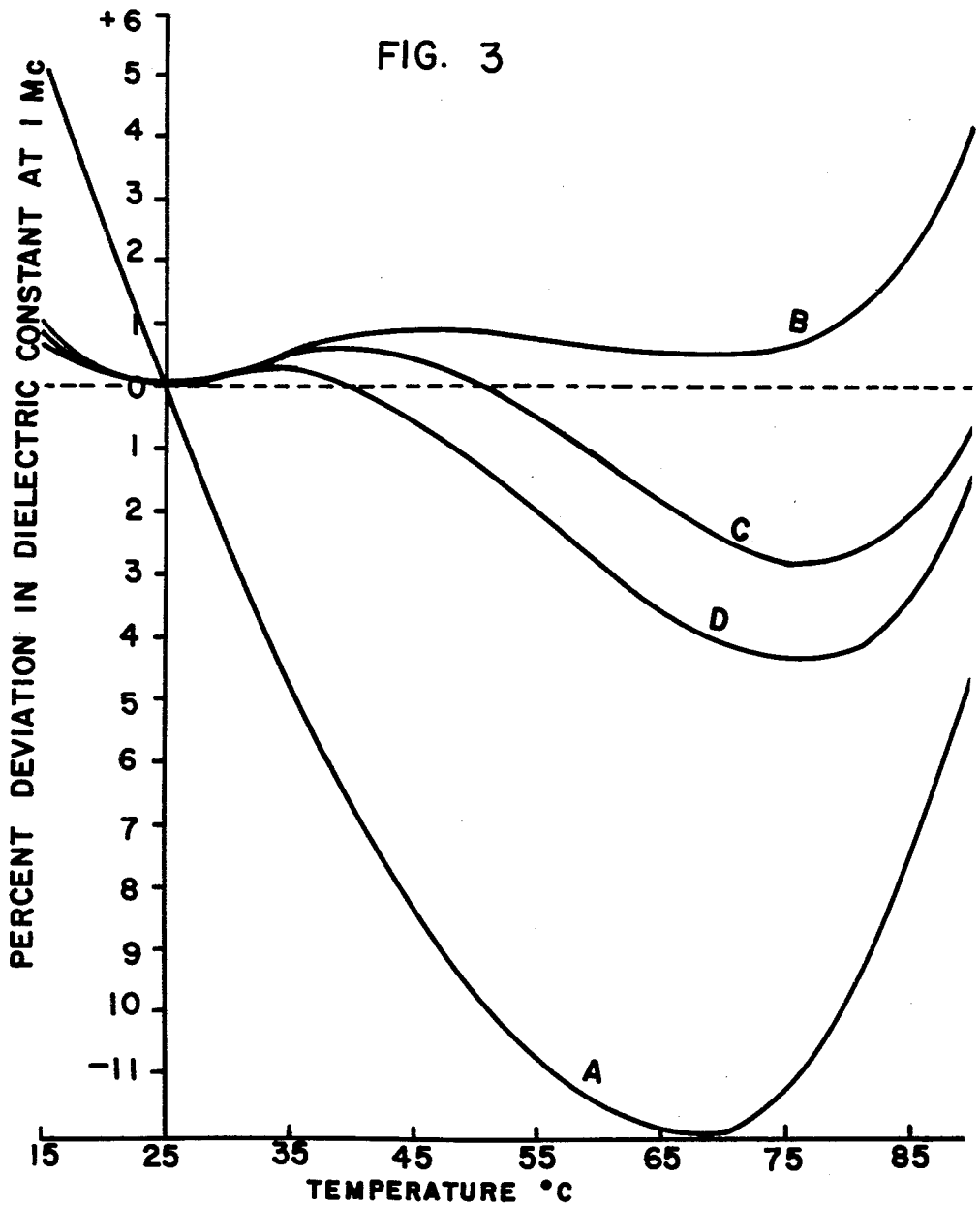

3,035,927
CERAMIC DIELECTRIC COMPOSITIONS
Anthony D. Janulionis, North Tonawanda, N.Y., assignor to National Lead Company, New York, N.Y., a corporation of New Jersey
Filed Dec. 31, 1959, Ser. No. 863,078
4 Claims. (Cl. 106—39)

The invention of the present application relates to ceramic dielectric bodies. It is particularly concerned with ceramic dielectric bodies that have high dielectric constants and at the same time have substantially flat temperature coefficients of capacity and low power factors.

In the electronics industry there is a wide-spread demand for capacitors or condensers of high capacity and small volume. These require bodies having high dielectric constants and low power factors. Such dielectric bodies are known. In addition, however, it is desirable for the dielectric bodies to have low temperature coefficients of capacity within the working range thereof, thus minimizing or preventing changes in the circuit constants of those electrical circuits in which capacitors using such bodies are employed. This combination of characteristics has hitherto not been satisfactorily obtained in a ceramic dielectric body.

It is, therefore, an object of the present invention to provide ceramic dielectric bodies having high dielectric constants and temperature coefficients of capacity between 15° C. and 85° C. which are so low as to be practically negligible.

Another object of the invention is to provide ceramic dielectric bodies of the character described which have low power factors.

A further object of the invention is to provide ceramic dielectric bodies of the character described which may be economically and readily produced.

Other objects and advantages of the present invention will be apparent in the following description of the production of ceramic dielectric bodies in accordance therewith.

Barium titanate ($BaTiO_3$) is a well known ceramic dielectric material and bodies with high dielectric constants may be formed therefrom. Such bodies are, however very sensitive to temperature changes and the dielectric constant (K) thereof varies greatly with temperature as shown by the curve in FIGURE 1 of the accompanying drawings.

It has been found that if very small amounts of cerium oxide are added to barium titanate compositions that contain small excesses of $TiO_2$ over the theoretical amounts, the resulting compositions when fired produce ceramic bodies which have the desired characteristics of high K, low power factor, and low temperature coefficient of capacity. This is illustrated in the following typical examples.

*Example 1*

A mixture was prepared of 99.25 parts of finely divided barium titanate ($BaTiO_3$), that contained approximately 0.46% $TiO_2$ in excess of the theoretical amount, with 0.75 parts of powdered cerium oxide ($CeO_2$). After the mixture was wet milled to minimize segregation, it was dried at 120° C. and passed through a 20 mesh screen to break it up. The screened product was placed in a mold and pressed at 10,000 p.s.i. to form a disc. The ceramic disc was matured by firing it in an oxidizing atmosphere containing water vapor to about 2550° F., the temperature being gradually raised and held at the maximum temperature for 2 hours. After the disc was cooled, silver electrodes were formed on the flat faces of the disc thus prepared by applying silver paste thereto and refiring the disc for 30 minutes at 1500° F.

Electrical tests of the above-described disc at 1 megacycle and the standard test temperature of 25° C. showed a dielectric constant (K) of 1995 and a power factor of 1.45%. These compare favorably with the corresponding figures, 1775 and 1.00% obtained with a disc made in a similar manner from the same barium titanate, but without the addition of cerium oxide.

Further electrical tests were conducted on the ceramic dielectric body or disc produced in accordance with the foregoing example at a number of temperatures between 15° C. and 85° C. It was found that throughout this temperature range the dielectric constant of the disc varied only to a minor degree as compared with the dielectric constant thereof at 25° C. In FIGURE 2 the curve B represents in percentage the deviation at various temperatures of the dielectric constant (K) of the disc from the dielectric constant thereof at 25° C., the K being measured at one megacycle in all cases. Curve A in FIGURE 2 represents in percentage, with respect to the dielectric constant thereof at 25° C., the deviation through the same temperature range of the dielectric constant of a ceramic dielectric body from the same type of barium titanate but without the addition of cerium oxide which was prepared in accordance with the procedure of Example 1. In all cases the K was measured at one megacycle. When curves A and B are compared, it is obvious that the percent deviation, not more than about 4%, in K of the $BaTiO_3$-$CeO_2$ body over the range of temperature is so small in comparison as to be negligible.

*Examples 2–5*

Four ceramic dielectric discs similar to the one described above were made by the procedure set forth in Example 1 from mixtures of the same type of barium titanate described therein with sufficient cerium oxide ($CeO_2$) to give in the fired bodies cerium oxide contents, respectively, of 0.80%, 0.90%, 0.95%, and 1.0%. Tested at 25° C. and one megacycle, these bodies had values of K, respectively, of 2165, 2340, 2265 and 2430.

The dielectric constants, at one megacycle, of these discs were determined at a number of temperatures between 15° C. and 85° C. and the deviations throughout this range of temperatures from the dielectric constants thereof at one megacycle and the standard test temperature of 25° C. were found to be very small throughout this range of temperatures. In FIGURE 2 the curves C, D, E, and F represent, respectively, the percent deviation in K from that at 25° C. of the discs containing 0.80%, 0.90%, 0.95% and 1.00% $CeO_2$. As with the dielectric disc of Example 1, the deviations are not in excess of about 4% for any of the discs.

*Example 6*

A mixture was prepared of 0.9 part of powdered ceric oxide ($CeO_2$) with 99.1 parts of powdered barium titanate ($BaTiO_3$) which contained approximately 0.8% $TiO_2$ in excess of the theoretical amount. The mixture was wet milled to obtain thorough mixing and was then dried at 120° C. The resulting cake was broken up to form a granular mix by passing it through a 20 mesh screen. A disc was then prepared from the granular mix by pressing in a mold at 10,000 p.s.i. Maturation of the disc was secured by firing it in an oxidizing atmosphere containing water vapor, the temperature being gradually raised to between 2500° F. and 2600° F. and held in that temperature range for 2 hours. When cool, the ceramic disc was provided with silver electrodes by brushing silver paste on the flat faces and refiring for 30 minutes at 1500° F.

Tests of the disc obtained, at 1 megacycle and the standard test temperature of 25° C., showed a dielectric constant of 1900 and a power factor of 1.10%. These figures contrast favorably with the corresponding figures for a ceramic disc made similarly from the same barium titanate, but without the addition of cerium oxide, viz. 1390 and 2.00%.

Further electrical tests were made of the two dielectric discs mentioned in the preceding paragraph. It was found that the disc formed of barium titanate alone had a much greater deviation in dielectric constant at one megacycle through the temperature range from 15° C. to 85° C. from the dielectric constant at 25° C. than did the disc containing cerium oxide. In FIGURE 3 curve A represents such percent deviation of the barium titanate disc while curve B represents such percent deviation of the disc containing 0.90% $CeO_2$ with barium titanate.

*Examples 7–8*

Using the procedure of Example 2 and barium titanate of the same type, two additional ceramic dielectric discs were made which contained, respectively, 0.95% and 1.00% cerium oxide dispersed in the barium titanate. These were found to have values of K at 25° C. and one megacycle of 2320 and 2503, respectively.

In further electrical tests at a number of temperatures between 15° C. and 85° C. it was found that the dielectric constants at one megacycle of both of the last-mentioned discs throughout this temperature range deviated to a relatively small degree from the dielectric constants of the respective bodies at 25° C. The percent deviations are represented, respectively, by curves C and D in FIGURE 3. Like the novel dielectric bodies of Examples 1–6, the percent deviations of these discs are not in excess of about 4% throughout the specified temperature range.

It is evident from the foregoing description that ceramic dielectric bodies formed by firing mixtures of barium titanate with very small amounts of $CeO_2$ are quite useful since, when such bodies are used as capacitors, there is only a negligible variation in their capacity within the normal operating temperature range of 15° C.–85° C. Hence, circuits including such capacitors may be advantageously used, for example, in band pass filter circuits used to separate the individual channels in multi-channel telephony and in fixed tuned intermediate frequency amplifier circuits of the type used in superheterodyne radio receivers. Another example of an advantageous use is in resistance-capacitance frequency determining circuits such as used in Wien bridge audio frequency oscillators. Of course, capacitors according to this invention may be made in any desired size and shape.

As will be seen from the examples set forth above, the percentage of cerium oxide effective to produce the desired characteristics in dielectric ceramic bodies which are composed predominantly of barium titanate is not greater than about 1% of the body. The cerium oxide may be added to the mix for the bodies as such or as a cerium compound such as cerium oxalate that will decompose to cerium oxide during the firing of the discs or bodies. The barium titanate also may, if desired, be formed in situ, for example, by the reaction of barium oxide or carbonate and titanium oxide. The excess of $TiO_2$ in the barium titanate over the theoretical amount may range from about 0.3% to about 1.0%, this being the usual range of excess $TiO_2$ in barium titanate intended for capacitors and the like.

Maturation of the bodies, as with all ceramic bodies, is a matter of interrelated time and temperature, i.e. a body may be fired to maturity in a long time at one temperature while a shorter heating time at a higher temperature will suffice. Consequently, although the firing procedure set out in the foregoing examples is preferred from the standpoint of convenience, other time-temperature relations may be employed. It will be recognized from the foregoing description that the examples are not intended to be limiting and that the invention should be construed as broadly as permitted by the appended claims.

All references herein to percentages and parts relate to percentages and parts by weight unless otherwise indicated.

I claim:

1. A ceramic dielectric body formed from barium titanate, in which there is a $TiO_2$ excess over the stoichiometric amount required for barium metatitanate of from about 0.3% to about 1%, and cerium oxide, said body having a dielectric constant at 25° C. and 1 megacycle of from about 1900 to about 2500 and a negligible temperature coefficient of capacity between 15° C. and 85° C., the cerium oxide being present in an amount within the range from about 1.0% to 0.85% of the body.

2. A ceramic dielectric body as set forth in claim 1 in which about 1% of cerium oxide is present.

3. A ceramic dielectric body as set forth in claim 1 in which cerium oxide is present in an amount within the range from about 1.0% to 0.90%.

4. A ceramic dielectric body as set forth in claim 1 in which the deviation of the dielectric constant at 1 megacycle between 15° C. and 85° C. is not substantially in excess of 4% of the dielectric constant at 25° C.

References Cited in the file of this patent

UNITED STATES PATENTS

| | | |
|---|---|---|
| 2,616,813 | Klasens | Nov. 4, 1952 |
| 2,776,898 | Day | Jan. 8, 1957 |
| 2,985,700 | Johnston | May 23, 1961 |

OTHER REFERENCES

Baldwin—"How to Use Electronic Ceramics Better"—Ceramic Industry, September 1958, (pages 132–6).